(12) United States Patent
Samie

(10) Patent No.: US 8,056,694 B2
(45) Date of Patent: Nov. 15, 2011

(54) DISC CLUTCH ASSEMBLY WITH SEPARATING DEVICE

(75) Inventor: Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 772 days.

(21) Appl. No.: 12/119,109

(22) Filed: May 12, 2008

(65) Prior Publication Data

US 2009/0277742 A1 Nov. 12, 2009

(51) Int. Cl.
 *F16D 13/69* (2006.01)
 *F16D 13/52* (2006.01)
(52) U.S. Cl. ............... 192/70.28; 192/70.2; 192/107 R
(58) Field of Classification Search .............. 192/70.28, 192/85.4
 See application file for complete search history.

(56) References Cited

U.S. PATENT DOCUMENTS

| | | | |
|---|---|---|---|
| 2,174,240 A | 9/1939 | Glenney | |
| 2,523,501 A | 9/1950 | Davies et al. | |
| 3,455,423 A * | 7/1969 | Lindquist | 192/70.28 |
| 4,548,306 A | 10/1985 | Hartz | |
| 4,676,356 A * | 6/1987 | Beccaris et al. | 192/70.28 |
| 4,802,564 A | 2/1989 | Stodt | |
| 5,127,503 A * | 7/1992 | Gratzer | 192/70.11 |
| 6,508,337 B1 | 1/2003 | Esper | |

FOREIGN PATENT DOCUMENTS

| | | |
|---|---|---|
| JP | 1279123 A | 11/1989 |
| JP | 3009119 A | 1/1991 |
| JP | 2001165191 A | 6/2001 |
| JP | 2001234946 A | 8/2001 |
| JP | 2006207776 A | 8/2006 |

OTHER PUBLICATIONS

PCT Search Report for International Application No. PCTIUS2009/043237 mailed Dec. 23, 2009.

* cited by examiner

*Primary Examiner* — Rodney Bonck
(74) *Attorney, Agent, or Firm* — Quinn Law Group, PLLC

(57) ABSTRACT

A disc clutch assembly is provided that includes first and second sets of generally annular plates spaced alternately with one another. The plates of the first set have a friction interface. The first and second sets of plates are selectively engagable with one another at the friction interface for transferring torque loads. Separating devices are in contact with the plates radially inward of the friction interface. The separating devices are configured to bias the respective ones of the first and second sets of plates apart from one another when not selectively engaged.

7 Claims, 4 Drawing Sheets

DISC CLUTCH ASSEMBLY WITH SEPARATING DEVICE

TECHNICAL FIELD

The invention relates to a disc clutch assembly.

BACKGROUND OF THE INVENTION

Disc clutches, such as rotating-type clutches and brake-type clutches used in transmissions, have sets of closely spaced plates that are selectively engagable with one another to transmit torque loads. The plates generate significant amounts of heat, and require cooling and lubrication. The lubricated plates tend to generate drag, causing considerable spin losses.

SUMMARY OF THE INVENTION

A disc clutch assembly is provided that includes first and second sets of clutch plates spaced alternately and coaxial with one another. The plates of the first set have a friction material on a first portion of an outer surface thereof. The first and second sets of plates are selectively engagable with one another at the first portions of the first set for transferring torque loads. Separating devices are configured to bias the first and second sets of clutch plates apart from one another when not selectively engaged, thus reducing drag. Because the separating devices separate plates of the first set from plates of the second set, superior drag reduction is accomplished. Additionally, because the separating devices contact the plates of the first set at a portion that does not have friction material, i.e., at a portion with a lower coefficient of friction, drag due to the separating devices is minimal.

The plates of the first set may be referred to as friction plates and the plates of the second set may be referred to as reaction plates. In one embodiment, the separating devices may be flexible tabs integral with the friction plates that extend axially outward. For example, three integral tabs may extend axially outward in one direction, and three others may extend axially outward in an opposing direction. The integral tabs may be at a splined inner circumference of the friction plate. In another embodiment, the separating devices may be annular wave springs. With either embodiment, it may be optimal if the separating devices extend axially beyond the friction material not less than 0.5 mm and not more than 1.0 mm.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

First Embodiment

Figure 1:
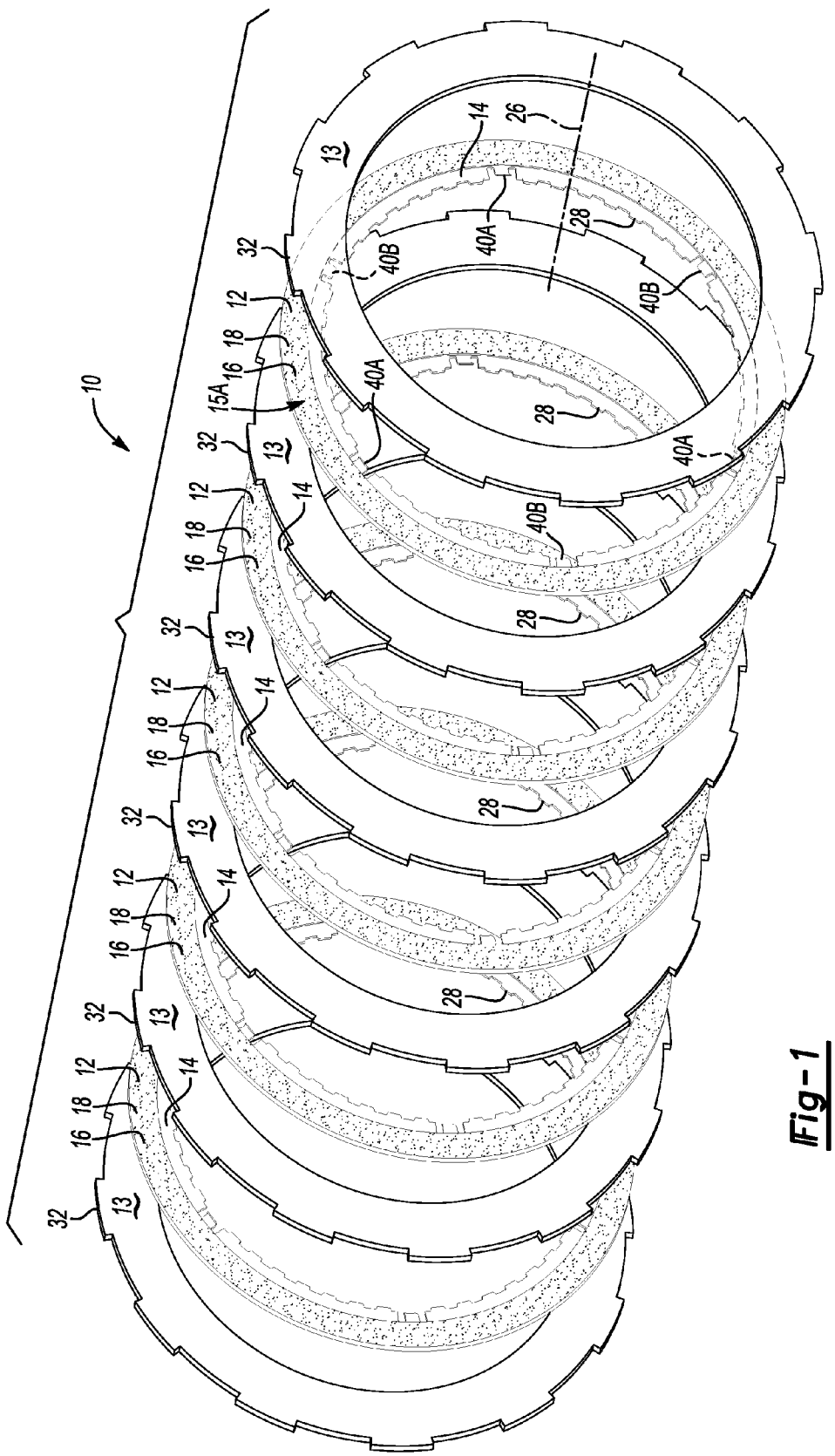
FIG. 1 is a schematic perspective exploded view of a first embodiment of a disc clutch assembly.
Figure 2:
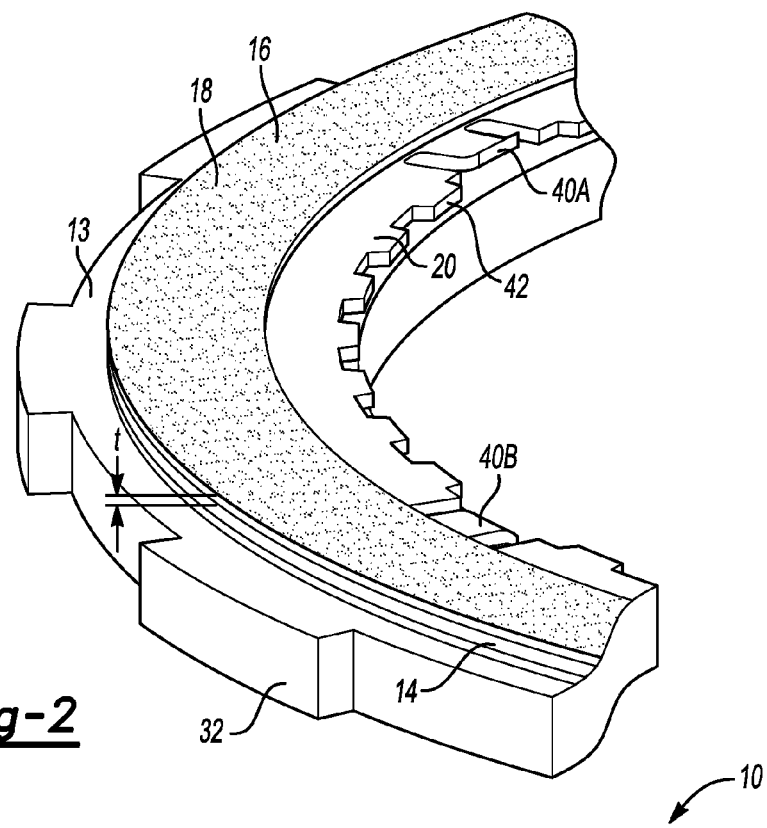
FIG. 2 is a schematic perspective fragmentary view of a portion of the disc clutch assembly of FIG. 1.

Referring to FIG. 1, a disc clutch assembly 10 is illustrated having a first set of clutch plates which are annular friction plates 12. As further explained below, the friction plates 12 are selectively engagable with a second set of clutch plates, which are annular reaction plates 13, to transmit torque loads, and, when not engaged, are separated from the reaction plates 13 via separating devices to minimize drag. The annular friction plates 12 each have a core 14 with opposing side faces 15A, 15B ((see FIG. 3) also referred to as an outer surface) with a radially outer portion 16 on which a friction material 18 is adhered, bonded, or otherwise secured. The friction material 18 has an average thickness t. As best illustrated in FIG. 2, the friction material 18 does not cover a radially inner portion 20 of each of the friction plates 12. As used herein, the radially outer portion 16 is a first portion of the outer surface 15A, 15B, and the radially inner portion 20 is a second portion of the outer surface 15A, 15B.

Referring again to FIG. 1, the reaction plates 13 are spaced to alternate axially with the friction plates 12 (i.e., such that a friction plate 12 has an axially adjacent reaction plate 13 on either side thereof). The reaction plates 13 and the friction plates 12 are coaxial about a center axis 26 shown in FIG. 1. The friction plates 12 each have a splined inner circumference 28 at which they may be operatively connected with an outwardly splined shaft or hub, represented at 30 in FIG. 3. The reaction plates 13 have a splined outer circumference 32 at which they may be connected to an inwardly splined component represented schematically at 34 in FIG. 3, which may be a hub or housing. The shaft 30 may rotate, in which case the friction plates 12 rotate commonly with the shaft 30. If component 34 is a rotatable hub, the reaction plates 13 rotate with the component 34, in which case the disc clutch is a rotating-type clutch. If component 34 is a stationary housing, the reaction plates 13 are stationary with component 34, in which case the disc clutch 10 is a stationary-type clutch (i.e., a brake-type clutch).

Figure 3:
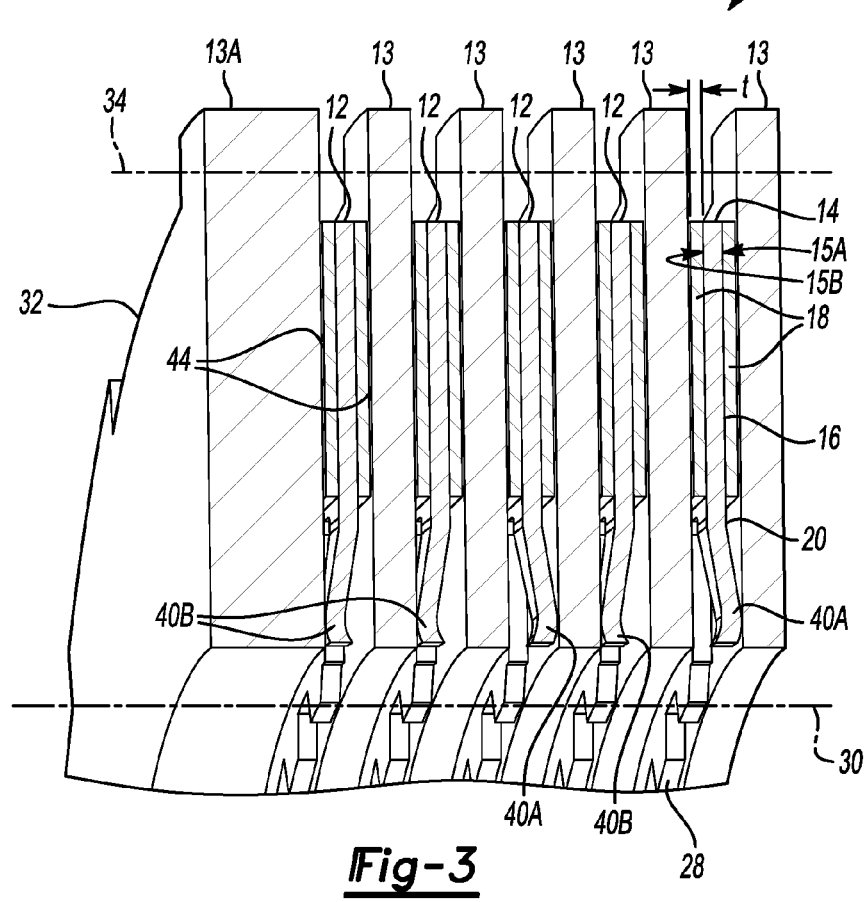
FIG. 3 is a schematic perspective cross-sectional and fragmentary view of a portion of the disc clutch assembly of FIGS. 1 and 2.

Referring to FIGS. 1-3, the friction plates 12 each have separating devices in the form of integral tabs 40A, 40B spaced around the splined inner circumference 28 and extending axially in opposite directions (those extending in one direction referred to as 40A and those extending in the opposing direction referred to as 40B). The tabs 40A, 40B are positioned in lieu of a spline 42, and as best shown in FIG. 2, do not extend as far radially inward as the splines 42 so that the tabs 40A, 40B will not contact the shaft 30. In the embodiment of FIGS. 1-3, the tabs 40A, 40B are spaced evenly about the inner circumference 28, with a total of six tabs on each friction plate 12, with three of the tabs extending axially in one direction and three of the tabs extending axially in the opposing direction. Although some of the tabs are obscured from view in FIG. 1, all six tabs are shown on the rightmost friction plate 12, with some of the tabs shown in phantom. (Tabs 40A, 40B that are obscured on the other friction plates 12 are not shown in phantom for clarity in the drawing.) Other arrangements or another number of tabs may be used within the scope of the claimed invention.

The tabs 40A, 40B extend in alternate axial directions sequentially around the inner circumference 28. FIG. 2 shows a portion of a friction plate 12, with one tab, referred to as 40A, extending in a first axially direction (upward in the view of FIG. 2) and one of the tabs, referred to as 40B, extending in a second axial direction (downward in the view of FIG. 2).

The tabs 40A, 40B are flexible, and are biased to the axial positions shown in FIGS. 1 and 2, but flex under pressure when the plates 12, 13 are engaged.

As shown in FIG. 1, the friction plates 12 are rotated relative to one another such that the tabs 40A, 40B on any one of the friction plates 12 do not necessarily align with the tabs 40A, 40B on the next axially positioned friction plate 12. This evenly distributes the axial forces exerted by the tabs 40A, 40B on the adjacent reaction plates 13. However, the tabs 40A and 40B on the respective friction plates 12 may be aligned as shown in the assembled cross-sectional view of FIG. 3.

The reaction plates 13 include an apply plate labeled 13A (i.e., the reaction plate 13 shown at the left side of FIG. 3), typically of a wider width than the others, that is axially movable in response to hydraulic pressure to move all of the plates 12, 13 in closer relation axially, with the apply plates engaging the reaction plates at the friction material 18. In FIG. 3, the disc clutch assembly 10 is shown in an unengaged state, as is apparent by the slight gaps 44 between the friction material 18 and the reaction plates 13. The gaps 44 shown are with the friction material 18 at its starting thickness t; however, if the friction material 18 wears slightly, the gaps 44 will grow in size accordingly. The flexible tabs 40A, 40B may extend axially outward 0.5 mm to 1.0 mm beyond the friction material 18 so that the gap is 0.5 mm to 1.0 mm. The respective tabs 40A, 40B at the radially inner portions 20 of the friction plates 12 are shown in contact with the reaction plates 13 and bias the adjacent reaction plates 13 apart from the friction plates 12. Specifically, the tabs 40A, 40B bias the reaction plates 13 away from contact with the radially outer portion 16 of the friction plates 12 with the friction material 18 thereon. Although only one tab 40A or 40B is visible per friction plate 12 in FIG. 3, as discussed with respect to FIG. 1, there are multiple additional tabs 40A, 40B extending axially in either direction from each friction plate 12, such that the reaction plates 13 on either side of the respective friction plate 12 are biased axially away. The tabs 40A, 40B are flexible such that axial movement of the apply plate 13A toward the adjacent friction plate 12 overcomes the bias of the tabs 40A, 40B sufficiently to compress the tabs axially inward toward greater radial alignment with the radially outer portions 16 of the friction plates 12.

Second Embodiment

Figure 4:
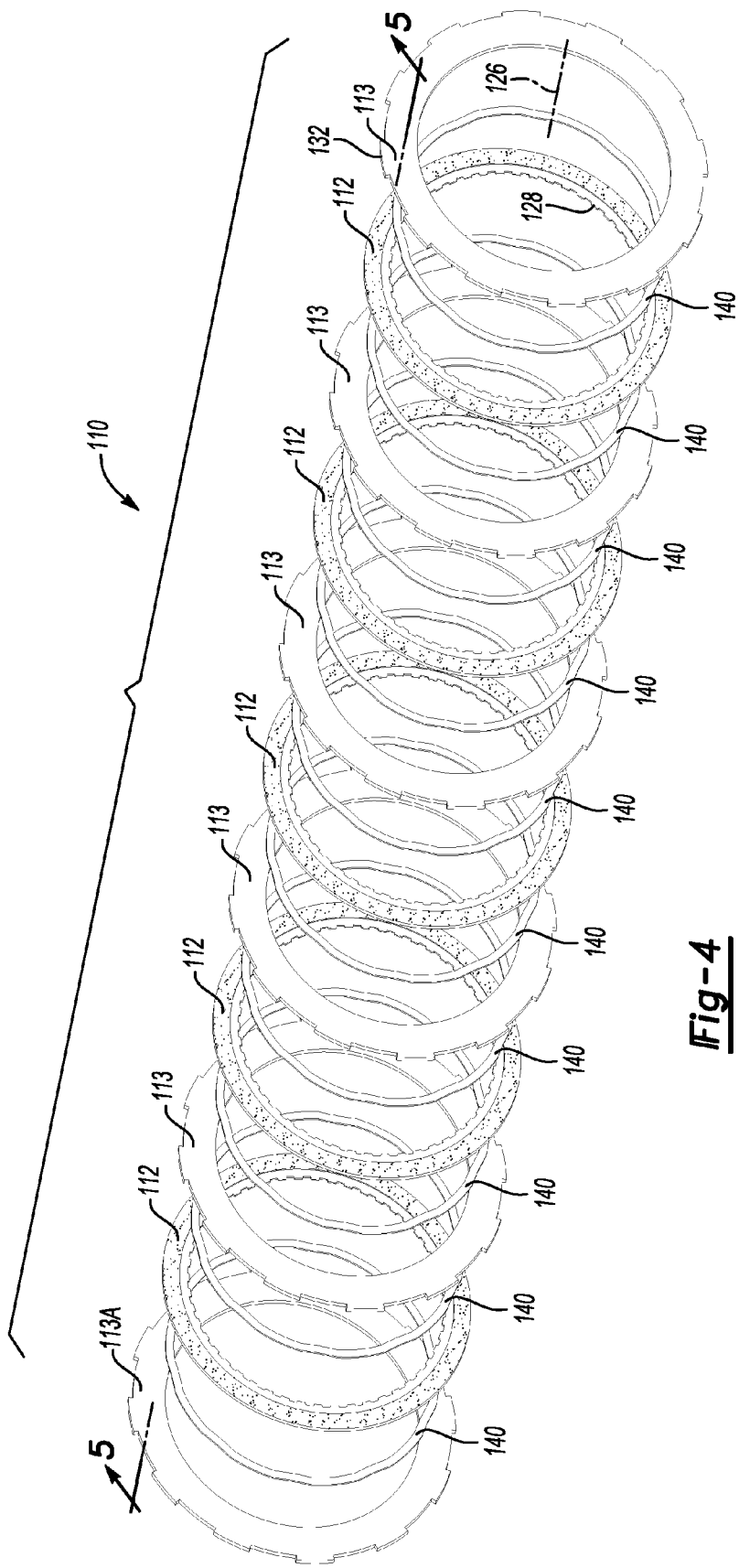
FIG. 4 is a schematic perspective exploded view of a second embodiment of a disc clutch assembly.
Figure 5:
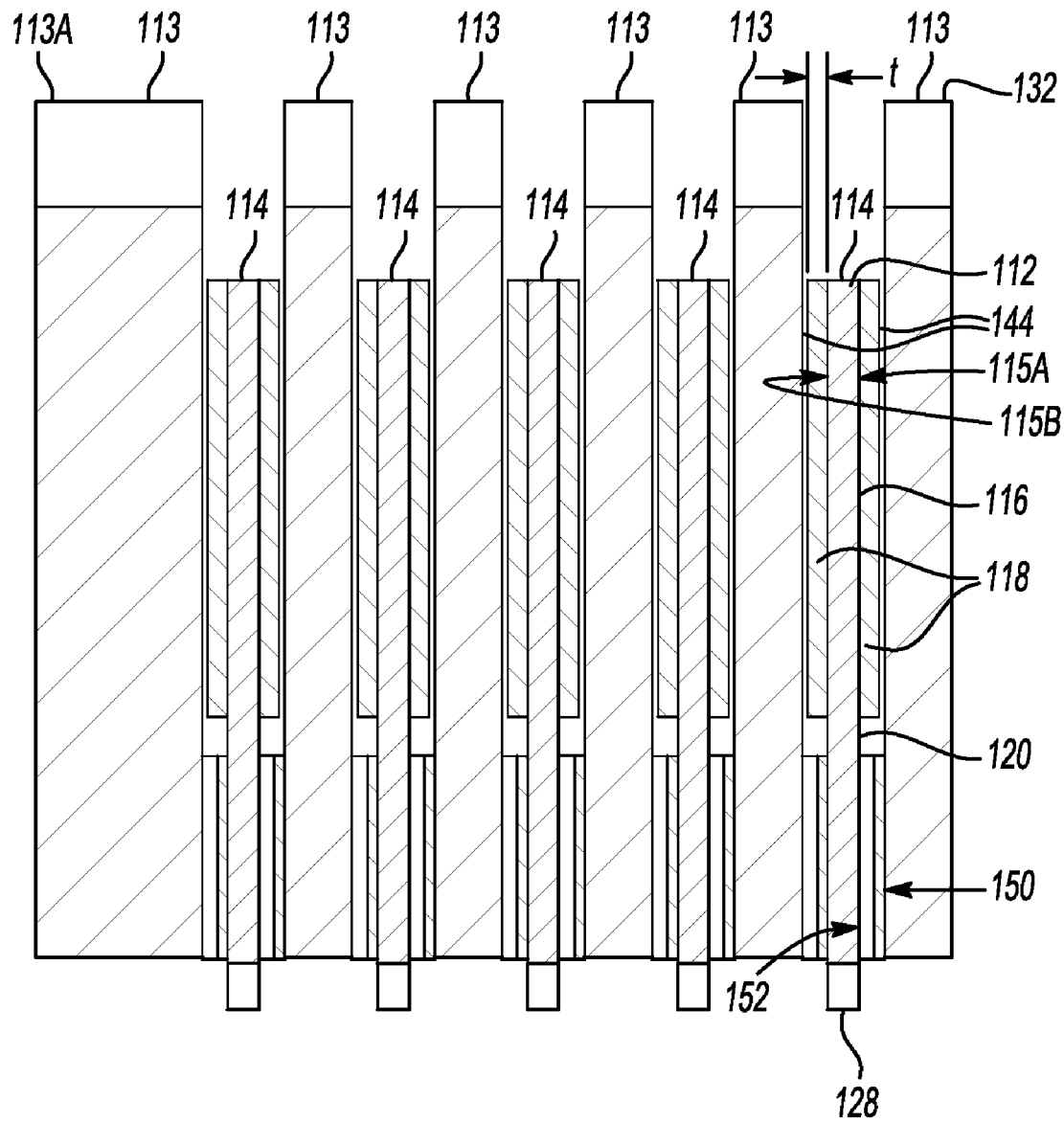
FIG. 5 is a schematic perspective cross-sectional and fragmentary view of a portion of the disc clutch assembly of FIG. 4.

Referring to FIG. 4, a disc clutch assembly 110 is illustrated having a first set of clutch plates which are annular friction plates 112. As further explained below, the friction plates 112 are selectively engagable with a second set of clutch plates, annular reaction plates 113, including an apply plate 113A, to transmit torque loads, and, when not engaged, are separated from the reaction plates 113 via separating devices 140 to minimize drag. The annular friction plates 112 each have a core 114 with opposing side faces 115A, 115B (see FIG. 5) (also referred to as an outer surface) with a radially outer portion 116 on which a friction material 118 is adhered, bonded, or otherwise secured. The friction material 118 has an average thickness t. As best illustrated in FIG. 5, the friction material 118 does not cover a radially inner portion 120 of each of the friction plates 12. As used herein, the radially outer portion 116 is a first portion of the outer surface 115A, 115B and the radially inner portion 120 is a second portion of the outer surface 115A, 115B.

Referring again to FIG. 4, the reaction plates 113 alternate axially with the friction plates 112 (i.e., such that a friction plate 112 has an axially adjacent reaction plate 113 on either side thereof). The reaction plates 113 and the friction plates 112 are coaxial about a center axis 126 shown in FIG. 4. The friction plates 112 each have a splined inner circumference 128 at which they may be operatively connected with an outwardly splined shaft or hub. The reaction plates 113 have a splined outer circumference 132 at which they may be connected to an inwardly splined component, which may be a hub or housing. The shaft connected with the friction plates 112 may rotate, in which case the friction plates 112 rotate commonly with the shaft. If the component is a rotatable hub, the reaction plates 113 rotate with the component splined thereto in which case the disc clutch 110 is a rotating-type clutch. If the component is a stationary housing, the reaction plates 113 are stationary with the component splined thereto, in which case the disc clutch 110 is a stationary-type clutch (i.e., a brake-type clutch).

Referring to FIGS. 4-5, separating devices in the form of annular wave springs 140 are sized to contact the radially inner portion 120 of a respective one of the friction plates 112 and an adjacent respective one of the reaction plates 113. The annular wave springs 140 have a slight wave pattern about the entire circumference thereof such that the wave spring 140 is sufficient in amplitude to extend axially between and in contact with the adjacent reaction plate 113 and radially inner portion 120 of the friction plate 112 when the disc clutch 110 is not engaged. Specifically, a first side surface 150 of one of the wave springs 140 contacts the reaction plate 113 and an opposing second side surface 152 of the wave spring 140 contacts the friction plate 112. Additionally, the overall axial distance between the side surfaces 150, 152 is sufficiently larger than the thickness t of the friction material 118 such that the wave spring 140 separates the friction plate 112 and friction material 118 from contact with the adjacent reaction plate 113 when the disc clutch 110 is not engaged, so that a gap 144 exists therebetween when the disc clutch 110 is not engaged. Preferably, the annular wave springs 140 are sized to extend axially outward beyond the friction material 118 so that the gap 144 is 0.5 mm to 1.0 mm. The gaps 144 shown are with the friction material 118 at its starting thickness t; however, if the friction material 118 wears slightly, the gaps 144 will grow in size accordingly. The total number of waves about the circumference of the wave spring 140 may be selected to result in the desired flexibility (i.e., resistance to compression) of the wave springs 140 as desired.

While the best modes for carrying out the invention have been described in detail, those familiar with the art to which this invention relates will recognize various alternative designs and embodiments for practicing the invention within the scope of the appended claims.

The invention claimed is:

1. A disc clutch assembly comprising:
    a first set of clutch plates each having a respective outer surface; wherein a first portion of the outer surface has a friction material thereon and a second portion of the outer surface is characterized by an absence of the friction material;
    a second set of clutch plates coaxial with the first set of clutch plates; wherein the clutch plates of the first set alternate axially with the clutch plates of the second set; wherein the first and second sets of clutch plates are configured to be selectively engagable with one another at the first portions of the first set for transferring torque loads;
    separating devices configured as flexible tabs integral with the first set of clutch plates in contact with the second set and configured to bias the first and second sets of clutch plates apart from one another when the clutch plates are not engaged;

wherein each of the clutch plates of the first set has an inner circumference with splines and with some of the flexible tabs spaced along the inner circumference between adjacent ones of the splines, with the splines extending radially inward further than the flexible tabs, and with the flexible tabs extending in one axial direction in contact with an adjacent one of said plates of said second set of clutch plates and others of said flexible tabs spaced along the inner circumference and extending in an opposing axial direction in contact with another adjacent one of said plates of said second set of clutch plates.

2. The disc clutch assembly of claim 1, wherein three of said flexible tabs extend in said one axial direction and three other of said tabs extend in said opposing axial direction.

3. The disc clutch assembly of claim 1, wherein the flexible tabs extend axially beyond the friction material not less than 0.5 mm and not more than 1.0 mm.

4. A disc clutch assembly comprising:
first and second sets of generally annular plates spaced alternately with one another; wherein the plates of the first set have a core with a friction interface on the core; wherein the first and second sets of plates are selectively engagable with one another at the friction interface for transferring torque; and
separating devices integrally formed with the first set of plates such that the core of each of said plates of said first set of plates is a single, unitary, one-piece component that includes multiple ones of said separating devices; and wherein the separating devices are positioned axially between and in contact with respective plates of the second set of plates radially inward of the friction interface and are configured to bias the first and second sets of plates apart from one another when the plates are not selectively engaged.

5. The disc clutch assembly of claim 4, wherein the plates of the first set each have a splined inner circumference; wherein the separating devices are flexible tabs at the respective splined inner circumference of the respective plates of the first set; wherein some of the flexible tabs of a respective plate of the first set extend toward one of the plates of the second set on one side of the respective plate of the first set and others of the flexible tabs of the respective plate of the first set extend toward another of the plates of the second set on another side of the respective plate of the first set.

6. The disc clutch assembly of claim 5, wherein the flexible tabs extend axially beyond the friction material not less than 0.5 mm and not more than 1.0 mm.

7. The disc clutch assembly of claim 5, wherein three of said flexible tabs of the respective plate of the first set extend in one axial direction and three other of said flexible tabs of the respective plate of the first set extend in an opposing axial direction.

\* \* \* \* \*